US006936372B1

(12) United States Patent
Jagota et al.

(10) Patent No.: US 6,936,372 B1
(45) Date of Patent: Aug. 30, 2005

(54) ENVIRONMENTAL CONTROL SYSTEM FOR USE WITH A BATTERY CABINET AND METHOD OF OPERATING A FAN THEREIN

(75) Inventors: Anurag Jagota, Plano, TX (US); Patrick K. Ng, Plano, TX (US); Jayesh R. Patel, Garland, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 426 days.

(21) Appl. No.: 10/219,713

(22) Filed: Aug. 15, 2002

(51) Int. Cl.$^7$ .................. H01M 10/44; H01M 10/50
(52) U.S. Cl. ............................. 429/50; 429/62
(58) Field of Search ..................... 429/50, 62, 120

(56) References Cited

U.S. PATENT DOCUMENTS

| 5,215,834 A | * | 6/1993 | Reher et al. ............... 429/62 |
| 6,037,747 A | | 3/2000 | Chalasani et al. .......... 320/125 |
| 6,123,266 A | | 9/2000 | Bainbridge et al. ........ 236/49.3 |

OTHER PUBLICATIONS

"A New Concept: Intermittent Charging of Lead Acid Batteries in Telecommunication Systems" by D.P. Reid, I. Glasa; 1984 IEEE; pp. 67-71.

* cited by examiner

Primary Examiner—Patrick Joseph Ryan
Assistant Examiner—Thomas H. Parsons

(57) ABSTRACT

The present invention is directed to an environmental control system for use with a battery cabinet having at least one battery and a fan employable to circulate air through the battery cabinet, and method of operating the fan to circulate air through the battery cabinet. In one embodiment, the environmental control system includes a voltage sensor that monitors a voltage associated with the battery, and a battery temperature sensor that monitors a temperature of the battery. The environmental control system also includes a fan control subsystem, coupled to the voltage and battery temperature sensors, that activates the fan upon an occurrence of one of: the temperature of the battery exceeding a predetermined temperature, and the voltage associated with the battery exceeding a predetermined voltage.

21 Claims, 4 Drawing Sheets

ENVIRONMENTAL CONTROL SYSTEM FOR USE WITH A BATTERY CABINET AND METHOD OF OPERATING A FAN THEREIN

TECHNICAL FIELD OF THE INVENTION

The present invention is directed, in general, to power systems and, more specifically, to environmental control system for use with a battery cabinet, method of operating a fan therein, and a battery cabinet employing the same.

BACKGROUND OF THE INVENTION

The traditional reliability of telecommunication systems that users have come to expect and rely upon is based in part on the systems' operation with redundant equipment and power supplies. Telecommunication switching systems, for example, route tens of thousands of calls per second. The failure of such systems, due to either equipment breakdown or loss of power, is unacceptable since it would result in a loss of millions of telephone calls and a corresponding loss of revenue.

Power plants, such as battery plants, address the power loss problem by providing the system with an energy reserve, i.e., a backup battery, in the event of the loss of primary power to the system. A battery plant generally includes a number of battery cabinets with backup batteries, rectifiers and other power distribution equipment. The primary DC power is produced by the rectifiers, which typically convert AC commercial voltage into a DC voltage to power the load equipment as well as to charge the backup batteries. The primary power may, however, become unavailable due to an AC power outage or the failure of one or more of the rectifiers. In either case, the backup batteries then provide power to the load.

A battery plant that powers telecommunications systems such as transmission and switching systems in wireless base stations commonly employs valve-regulated lead-acid (VRLA) batteries as the energy reserve. The backup batteries are typically coupled directly to the output of the rectifiers and may provide power to the load in the event an AC power outage occurs. During normal operation, the backup batteries are usually maintained in a substantially fully-charged state to extend a duration for which the backup batteries can provide energy to the load equipment.

With the increasing trend toward distributed power systems, the battery reserve systems are often located in outdoor uncontrolled environments. Over a decade of experience in using VRLA batteries in outdoor environments has clearly shown that high temperatures drastically reduce the life of the batteries. The lifetime of a typical VRLA battery with a rated life of ten years at a constant operating ambient temperature of 25° C. will be reduced by a factor of two for approximately every 7° C. to 10° C. rise in average operating temperature. When deployed in outdoor environments, the batteries are generally placed in closed cabinets with poor heat-exchange characteristics. The batteries are, therefore, often exposed to high temperatures with poor ventilation. As a result, a ten-year rated battery may have its lifetime reduced to a quarter or to a third of its rated value, especially in warmer climates such as Dallas, Tex.

While reducing the temperature of the operating environment of the battery is an important factor in sustaining the life of the battery, there are other ancillary considerations as well. The system employed to maintain the battery in a state of readiness (i.e., fully-charged) is another important consideration in battery reserve systems. A known technique to improve the life of a battery is to employ an intermittent charging system. An intermittent charging system is disclosed in *A New Concept: Intermittent Charging of Lead Acid Batteries in Telecommunication Systems*, by D. P. Reid, et al. (Reid), Proceedings of INTELEC 1984, pp. 67–71, which is incorporated herein by reference.

Since the commercial AC power source is typically available about 99.9% of the time, the battery is conventionally maintained in a float mode wherein the battery is fully charged and is essentially being topped-off continuously. With an intermittent charging system, the battery is only charged a fraction of the time and, otherwise, the battery is disconnected from the charging circuit. Such a system is very sensible with VRLA batteries especially in view of the fact that VRLA batteries suffer from relatively low self-discharge rates (e.g., less than 10% over a 180 day period at about 25° C.).

Analogous to the loss of battery capacity at higher temperatures, it is estimated that the self-discharge rate approximately doubles for every 10° C. rise in temperature. Even with the increase in self-discharge rates associated with higher operating temperatures, a relatively low duty cycle (i.e., ratio of the charging time to total time) is sufficient to maintain the battery in a state of readiness should the commercial power source be interrupted. The reactions that diminish battery life during float charging are accelerated at higher temperatures thereby further contributing to the degradation of the life of the battery.

U.S. Pat. No. 6,123,266 to Bainbridge, et al. (Bainbridge) describes a "Cooling System for Stand-Alone Battery Cabinets," which is incorporated herein by reference. While providing a simple fan and fan control unit that moves cooling air through the battery cabinet, Bainbridge has many shortcomings. The fan control unit of Bainbridge is designed solely to turn the fan ON whenever the outside air temperature (synonymously referred to as "OAT") is cooler than the inside cabinet temperature (synonymously referred to as "ICT"), and to turn the fan OFF whenever the inside cabinet temperature is less than the outside air temperature. No provision is made for a temperature lag, i.e., a $\Delta T$ (ICT–OAT); thus, the fan control unit of Bainbridge will cycle ON once the outside air temperature is less than the inside cabinet temperature and, as soon as the outside air temperature exceeds the inside cabinet temperature, the fan control unit will turn the fan OFF. This cycle will repeat continuously as the inside cabinet temperature varies, resulting in potentially rapid ON/OFF/ON cycling of the fan. Of course, this repeated cycling is detrimental to the operation of the fan.

While commenting that "batteries have a large thermal mass and relatively long thermal time constant," Bainbridge makes no provision for considering the conditions wherein the inside cabinet temperature is 25° C. and the outside air temperature is less than 25° C., i.e., a period when it is probably unwise to run the fan. Running the fan under these conditions will only cool the battery further, and reduce its electrical current capacity (ampacity).

Additionally, Bainbridge makes the observation that "batteries are known to generate hydrogen as they are used." In actuality, the majority of hydrogen is produced when the batteries are charged, not when they are being discharged. That is, the electrolytic charging process drives off hydrogen from $H^+$ ions in the water medium of the acid electrolyte. Bainbridge, by describing outside cooling air inlet louvers near the top of the cabinet and air exhaust louvers near the bottom of the cabinet, also fails to recognize that hydrogen is lighter than air, and will therefore rise to the top of the cabinet, relying on suction from the fan at the bottom of the cabinet to draw the hydrogen from the top of the cabinet out through the air exhaust louvers. In fact, the preferred embodiment of FIG. 1 of Bainbridge shows several locations within the cabinet under the top and below each shelf that can become dead air spaces trapping the hydrogen with potentially explosive results.

Furthermore, Bainbridge makes no provision for those conditions when outside air temperature is greater than the inside cabinet temperature and the battery temperature exceeds 25° C. Bainbridge ignores the fact that a constant trickle charge is generally applied to the batteries at all times, with the voltage applied varying depending upon either outside air temperature or the inside cabinet temperature. This can result in charging of the batteries when the outside air temperature is much greater than 25° C. and will therefore produce more hydrogen. Thus, if the outside air temperature is greater than the inside cabinet temperature, Bainbridge will turn the fan OFF, and the hydrogen will accumulate in the battery cabinet, creating a potentially dangerous condition.

In addition, the charging voltage also affects the hydrogen generation rate. The relationship is: hydrogen generation is directly proportional to a higher charging voltage thereby resulting in increased hydrogen generation.

Accordingly, what is needed in the art is a recognition that maintaining a battery cabinet inside cabinet temperature is not the only important factor, and the charging voltage of a battery at temperatures well above, or well below, 25° C. can result in creation of more hydrogen gas. More particularly, what is needed is a battery cabinet environmental control system that overcomes the above-stated deficiencies in the prior art relating to both battery longevity and environmental safety.

SUMMARY OF THE INVENTION

To address the above-discussed deficiencies of the prior art, the present invention provides an environmental control system for use with a battery cabinet having at least one battery and a fan employable to circulate air through the battery cabinet. In one embodiment, the environmental control system includes a voltage sensor that monitors a voltage associated with the battery, and a battery temperature sensor that monitors a temperature of the battery. The environmental control system also includes a fan control subsystem, coupled to the voltage and battery temperature sensors, that activates the fan upon an occurrence of one of: the temperature of the battery exceeding a predetermined temperature, and the voltage associated with the battery exceeding a predetermined voltage.

In another aspect, the present invention provides a method of operating a fan to circulate air through a battery cabinet having at least one battery. In one embodiment, the method includes monitoring a voltage associated with the battery and a temperature of the battery. The method also includes activating the fan upon an occurrence of one of: the temperature of the battery exceeding a predetermined temperature, and the voltage associated with the battery exceeding a predetermined voltage.

In yet another aspect, the present invention provides a battery cabinet that includes, in one embodiment, a plurality of shelves and a plurality of batteries located on the plurality of shelves. The battery cabinet also includes at least one air inlet louver located in a bottom section of the battery cabinet, and at least one air outlet louver located in a top section of the battery cabinet. The battery cabinet still further includes a fan that circulates air from the at least one air inlet louver to the at least one air outlet louver through the battery cabinet and an environmental control system coupled thereto. The environmental control system includes a voltage sensor that monitors a voltage associated with at least one of the plurality of batteries, and a plurality of battery temperature sensors that monitor a temperature of a corresponding one of the plurality of batteries. The environmental control system also includes a fan control subsystem, coupled to the voltage and battery temperature sensors, that activates the fan upon an occurrence of one of the temperature of at least one of the plurality of batteries exceeding a predetermined temperature, and the voltage associated with at least one of the plurality of batteries exceeding a predetermined voltage.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
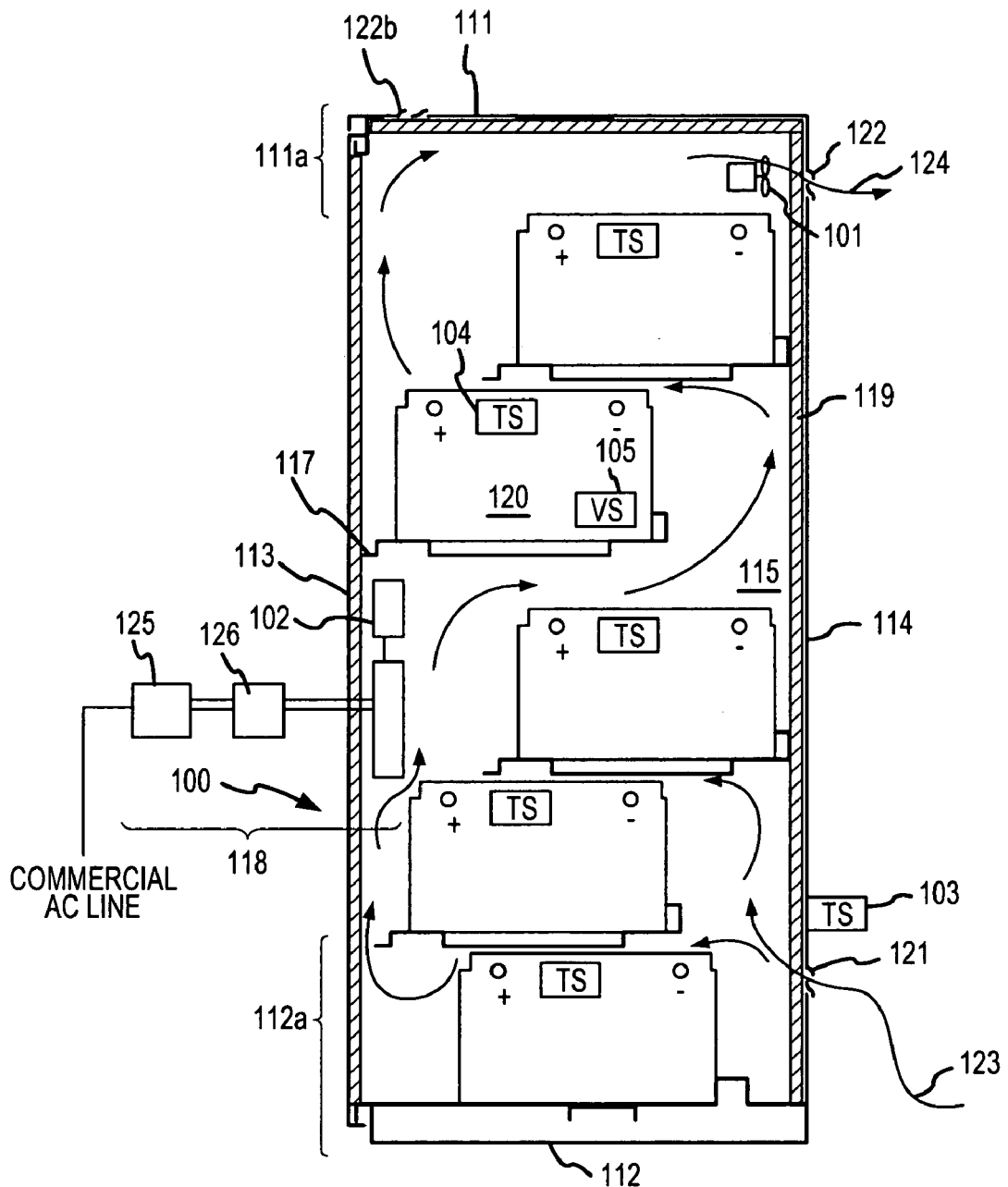
FIG. 1 illustrates a cut-away side view of a battery cabinet constructed according to the principles of the present invention.

Referring initially to FIG. 1, illustrated is a cut-away side view of a battery cabinet 100 constructed according to the principles of the present invention. The battery cabinet 100 includes a top wall 111 (adjacent a top section 111a of the battery cabinet 100), a bottom wall 112 (adjacent a bottom section 112a of the battery cabinet 100), a front wall 113, a rear wall 114, and side walls (one of which is illustrated and designated 115). The top, bottom, front, rear and side walls 111, 112, 113, 114, 115 include insulation (generally designated 119) on inner surfaces thereof. The battery cabinet 100 also includes a plurality of shelves (one of which is designated 117) with a plurality of batteries (one of which is designated 120) located thereon. Of course, in a normal installation, there would be a plurality of batteries 120 to deliver the ampacity required for backup operation of the system that the reserve power system supports.

The battery cabinet 100 is configured with an area of air inlet louvers (inlet louvers) 121, and an area of air outlet louvers (outlet louvers) 122. The inlet louvers 121 allow outside ambient air 123 to flow into the battery cabinet 100 and the outlet louvers 122 allow cabinet air to flow out of the battery cabinet 100 as shown by airflow 124. It should be noted that the inlet louvers 121 are located in the bottom section 112a of the battery cabinet 100. This location for the inlet louvers 121 is preferable because cooler air will normally be located near the bottom section 112a of the battery cabinet 100. Also, the outlet louvers 122 are located in the top section 111a of the battery cabinet 100, as the hottest air within the battery cabinet 100 will otherwise collect there because warm or hot air rises. Of course, while the hottest air within the battery cabinet 100 will be near the top section, outlet louvers 122b may alternatively be located in the top wall 111 and achieve similar efficiency from the warm air rising within the battery cabinet 100.

An environmental control system controls the operation of a fan 101 in the battery cabinet 100 and includes a fan control subsystem 102, an outside air temperature sensor 103, a plurality of battery temperature sensors (one of which is designated 104, also designated in the FIGURE as TS), and a voltage sensor 105 (also designated in the FIGURE as VS). The outside air temperature sensor 103 monitors a temperature of air surrounding the battery cabinet 100 and may be a thermocouple with appropriate sensing range, e.g., from about −40° C. to about +60° C., for an anticipated outside air environment. Similarly, the battery temperature sensors 104 monitors a temperature of the batteries 120 and may be a thermocouple with appropriate sensing range for an expected range, e.g., from about −10° C. to about +40° C., of battery temperatures. While this range is cited, it should be understood that valve-regulated lead-acid (VRLA) battery operation in much of this range is undesirable. The specification or "design to" temperature for VRLA batteries is about 25° C. Any significant battery temperature deviation from 25° C. is detrimental to battery life, the extension of which is one of the objectives of the present invention.

A battery charging circuit 118 including a rectifier 125 and a voltage control circuit 126 is coupled between the batteries 120 and a commercial AC line. While the battery charging circuit 118 is illustrated as a stand alone system, typically charging circuits are located within the confines of a separate cabinet adjacent the battery cabinet 100. The rectifier 125 is coupled to and receives its operating power from the commercial AC line. One who is skilled in the art is familiar with battery charging circuits 118 and their use in accordance with AC power. Currently, switchmode power conversion is used to convert commercial AC line power to tightly-regulated DC power. Battery charging voltage should be tightly regulated to preserve the state of charge of the batteries.

Figure 2:
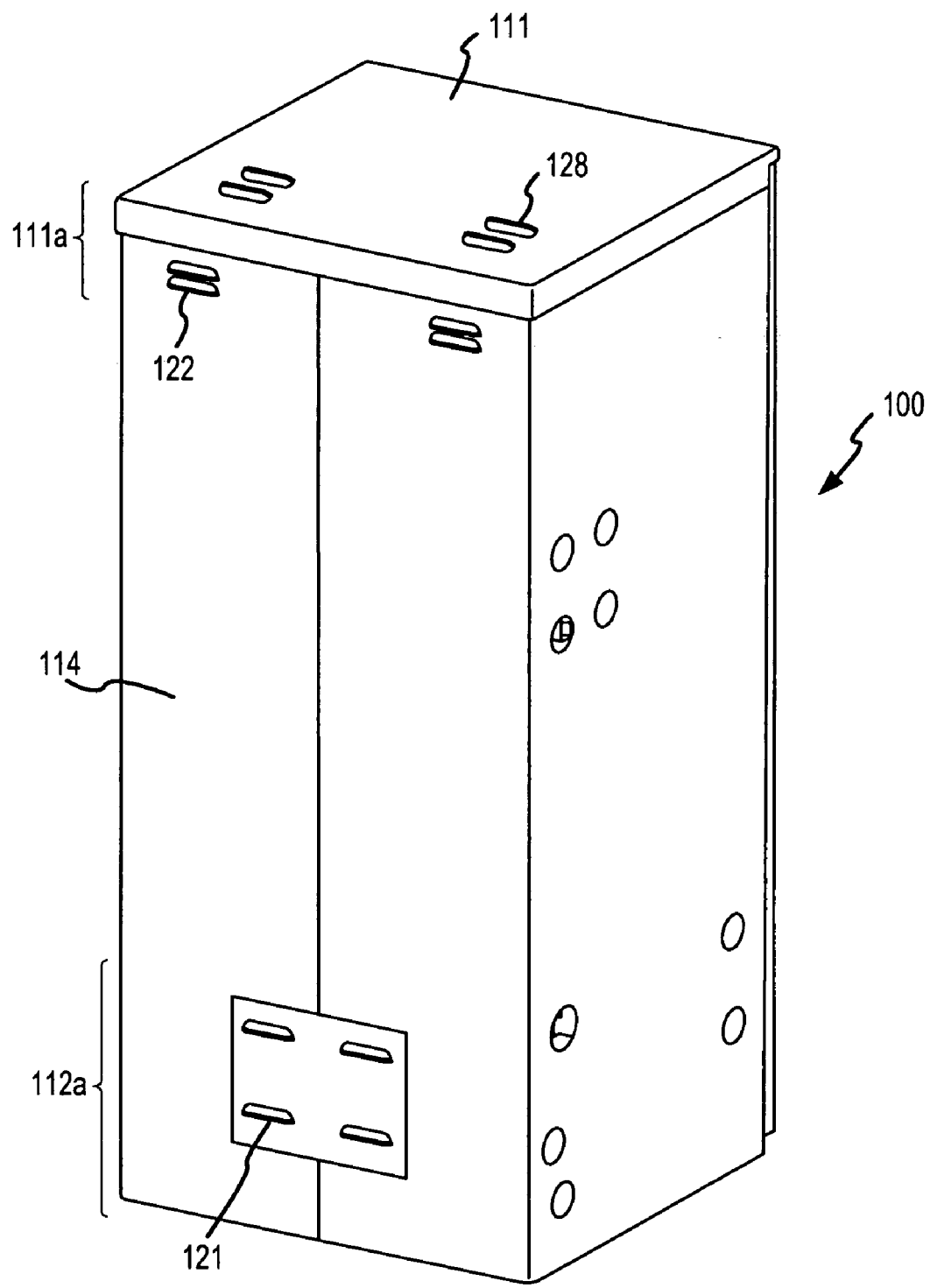
FIG. 2 illustrates an isometric view of the rear of the battery cabinet of FIG. 1 illustrating the location of the louvers therein.

Referring now to FIG. 2, illustrated is an isometric view of the rear of the battery cabinet 100 of FIG. 1 illustrating the location of the louvers 121, 122 therein. The outlet louvers 122 are located in the top section 111a of the battery cabinet 100 in the rear wall 114. The outlet louvers 122 may be fixed in place, or they may be hinged, enabling them to remain closed when the fan 101 is off to prevent unnecessary dust from entering the battery cabinet 100. In that configuration, the outlet louvers 122 open under pressure from airflow when the fan 101 is on. The intake louvers 121 are best fixed in an open position with a downward shielded opening to likewise prevent unnecessary dust from entering the battery cabinet 100. An alternate location for the outlet louvers is shown in an area designated 128.

Figure 3:
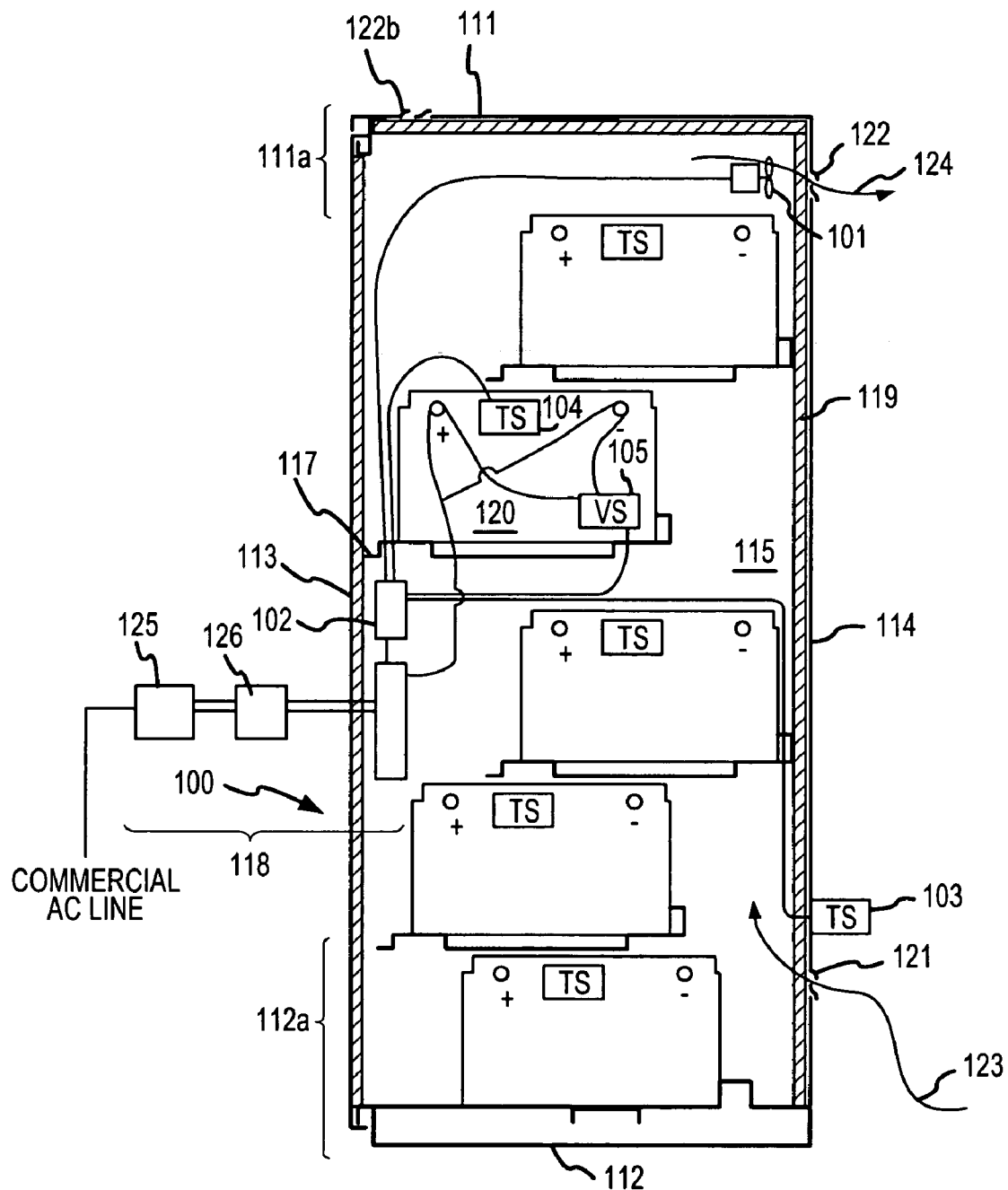
FIG. 3 illustrates a cut-away side view of the battery cabinet of FIG. 1 with representative electrical connections of the components shown.

Referring now to FIG. 3, illustrated is a cut-away side view of the battery cabinet 100 of FIG. 1 with representative electrical connections of the components shown. In an advantageous embodiment, each battery 120 has a battery temperature sensor 104 coupled thereto and that is electrically coupled to the fan control subsystem 102. The battery charging circuit 118 is parallel coupled to at least one, and preferably all, of the batteries 120 present in the battery cabinet 100. The battery temperature sensor 104 is additionally coupled to the voltage control circuit 126 that adjusts battery charging voltage to compensate for changes in the battery temperature. An alternative embodiment of the voltage control circuit 126 employs ambient temperature measured by a sensor (not shown) inside the battery cabinet 100 to set battery charging voltage. The voltage sensor 105 is coupled to an output of the battery charging circuit 118 to read battery charging voltage. The voltage sensor 105 is electrically coupled to the fan control subsystem 102 and registers a voltage associated with the batteries 120 such as the then-current battery charging voltage.

The fan control subsystem 102 is configured to activate the fan 101 if either: (a) battery temperature (synonymously referred to as "$T_{BAT}$") exceeds a predetermined temperature, or (b) a voltage associated with a battery 120 such as a charging voltage of the battery charging circuit 118 equals or exceeds a predetermined voltage. In a preferred embodiment, the predetermined temperature is about 40° C. That is, regardless of the charging voltage, when the battery temperature reaches at least about 40° C., the fan control subsystem 102 activates the fan 101. In another preferred embodiment, the predetermined voltage is 28.25 VDC for a battery system of a nominal 24 VDC or the predetermined voltage is 56.5 VDC for a battery system of a nominal 48 VDC. That is, regardless of the outside air temperature, when the charging voltage reaches at least about 28.25 VDC for a 24 VDC system or 56.5 VDC for a 48 VDC system, the fan control subsystem 102 activates the fan 101.

A reason to activate the fan 101 under either condition is driven by the following: (a) when the battery temperature exceeds 40° C., the battery charging circuit 118 will charge the batteries 120 which will give off flammable, hydrogen gas. Therefore, the presence of hydrogen within the battery cabinet 100 will create a potentially dangerous explosive/fire condition if not ventilated. The hydrogen is lighter than air and will rise to the top section of the battery cabinet 100, collecting there unless ventilated.

Likewise, when the charging voltage is greater than the predetermined voltage, increased hydrogen production occurs, again giving rise to a dangerous condition. Therefore, turning the fan 101 ON under these conditions relieves the accumulation of hydrogen and eliminates a hazardous situation. Furthermore, ventilating the hydrogen through the top section of the battery cabinet 100 takes advantage of the lighter-than-air property of hydrogen. In an advantageous embodiment, the fan 101 is an exhaust fan. That is, an exhaust fan is more efficient in expelling air that is otherwise trapped in the battery cabinet 100, than an intake fan might be in drawing ambient air from the cabinet surroundings.

Figure 4:
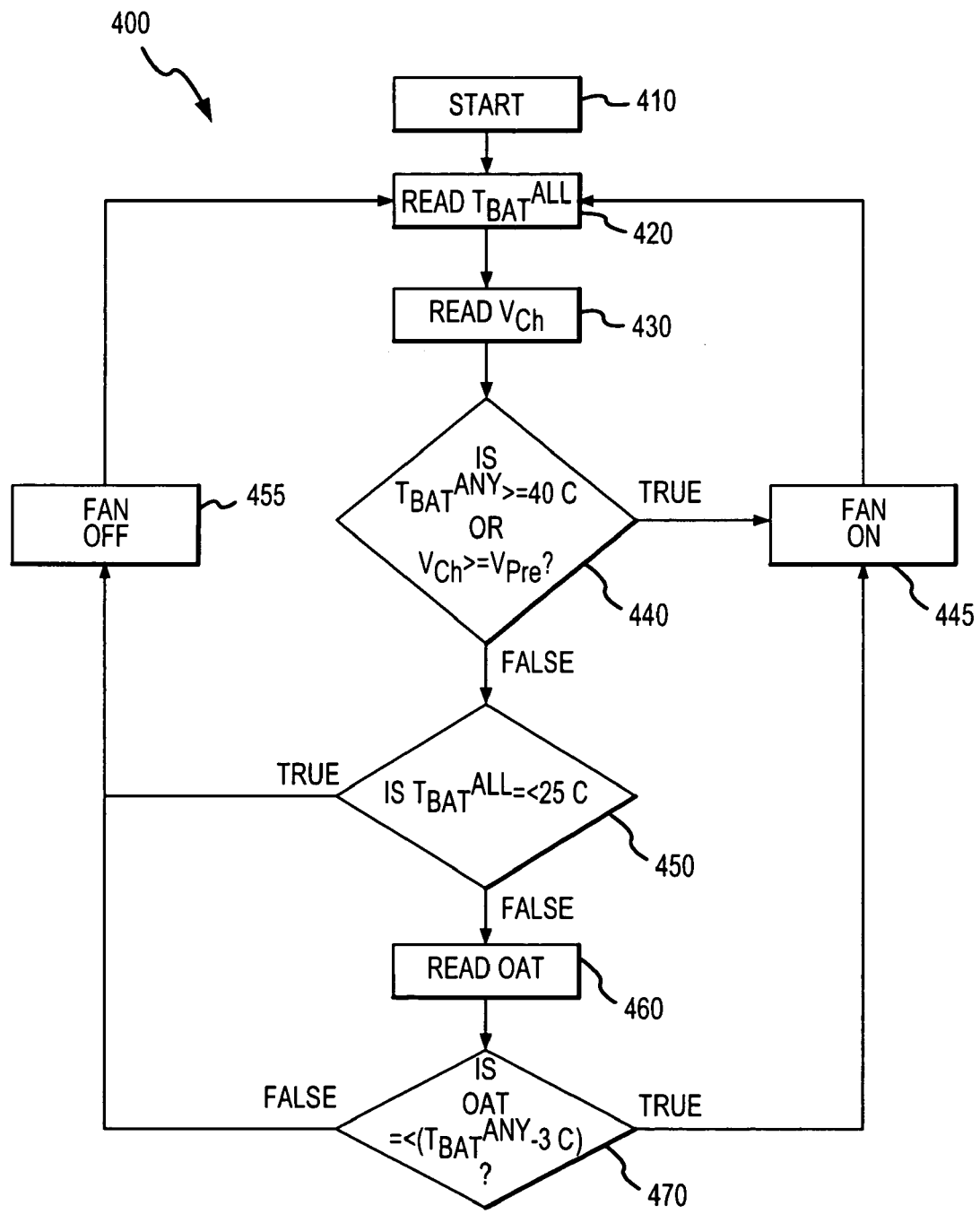
FIG. 4 illustrates a flow diagram of a method of operating a fan to circulate air through a battery cabinet in accordance with principles of the present invention.

Referring now to FIG. 4, illustrated is a flow diagram of a method 400 of operating a fan to circulate air through a battery cabinet in accordance with principles of the present invention. The method 400 begins at a start step 410. At a step 420, the method 400 reads individual battery temperatures for all batteries $T_{BAT}{}^{ALL}$. At a step 430, the method 400 reads a voltage associated with a battery such as a charging voltage $V_{Ch}$ determined, for instance, at the output of a battery charging circuit.

At a step 440, the individual battery temperatures are compared to a predetermined temperature (e.g., 40° C.) and the charging voltage $V_{Ch}$ is compared to a predetermined voltage $V_{Pre}$. If either of the conditions: (a) any individual battery temperature $T_{BAT}^{ANY}$ exceeds the predetermined temperature, or (b) the charging voltage $V_{Ch}$ equals or exceeds the predetermined voltage $V_{Pre}$ (i.e., the predetermined voltage $V_{Pre}$ is 28.25 VDC for 24 VDC systems or 56.5 VDC for 48 VDC systems) is TRUE, then the method 400 proceeds to a step 445 and the fan is activated (FAN ON). The method 400 then returns to step 420—Read $T_{BAT}^{ALL}$. If both of the conditions are FALSE, then the method 400 proceeds to a step 450. At the step 450, each of the individual battery temperatures $T_{BAT}^{ALL}$ is compared to a nominal temperature (e.g., 25° C.). If each of the battery temperatures $T_{BAT}^{ALL}$ is less than the nominal temperature, then the method 400 proceeds to a step 455 wherein the fan is deactivated (FAN OFF). The method 400 then returns to step 420—Read $T_{BAT}^{ALL}$.

Resuming at step 450, if each of the battery temperatures $T_{BAT}^{ALL}$ is not less than or equal to the nominal temperature, i.e., any battery temperature $T_{BAT}^{ANY}$ is greater than the nominal temperature, then the method 400 proceeds to a step 460. At step 460, the method 400 reads an outside air temperature OAT and proceeds to a step 470. At step 470, the outside air temperature OAT is compared to the temperature of each of the batteries $T_{BAT}^{ALL}$. If the outside air temperature OAT is less than or equal to the temperature of any battery $T_{BAT}^{ANY}$ minus a differential value (e.g., 3° C.), the method 400 proceeds to step 445 and activates the fan (FAN ON). The method 400 then returns to step 420—Read $T_{BAT}^{ALL}$. If the outside air temperature OAT is not less than or equal to the temperature of any battery $T_{BAT}^{ANY}$ minus a differential value (e.g., 3° C.), the method 400 proceeds to step 455 and the fan is deactivated.

The method 400 returns to step 420—Read $T_{BAT}^{ALL}$. The method 400 does not have a "stop" or "end" step because it is necessary to continuously monitor outside air temperature OAT, charging voltage $V_{Ch}$, and the temperature of all of the batteries $T_{BAT}^{ALL}$.

Thus, an environmental control system and related method have been described that operate a fan mounted within a battery cabinet to maintain battery temperature preferably at about 25° C. which will prolong battery life. The system and method also provide for increased ventilation, i.e., the fan is on, for safety purposes when, for instance, a charging circuit is operating and the battery is thereby producing hydrogen. Additionally, the inlet louvers are located in a bottom section of the battery cabinet to access the coolest ambient air surrounding the battery cabinet, and the outlet louvers and fan are located in a top section of the battery cabinet to take advantage of the lighter-than-air properties of heated air and hydrogen. Of course, the system, subsystems and related method may be embodied in hardware, software or combinations thereof.

Although the present invention has been described in detail, those skilled in the art should understand that they can make various changes, substitutions and alterations herein without departing from the spirit and scope of the invention in its broadest form.

What is claimed is:

1. For use with a battery cabinet having a plurality of batteries and a fan employable to circulate air through said battery cabinet, an environmental control system, comprising:
a voltage sensor configured to monitor a voltage associated with said plurality of batteries;
a plurality of battery temperature sensors configured to monitor a temperature of each of said plurality of batteries; and
a fan control subsystem, coupled to said voltage and battery temperature sensors, configured to activate said fan when:
any one of said temperatures of said plurality of batteries exceeds a predetermined temperature, or
said voltage associated with said plurality of batteries exceeds a predetermined voltage.

2. The environmental control system as recited in claim 1 wherein said predetermined temperature is about 40° C.

3. The environmental control system as recited in claim 1 wherein said predetermined voltage is about 28.25 volts for 24 volt systems and about 56.5 volts for 48 volt systems.

4. The environmental control system as recited in claim 1 wherein said environmental control system is configured to monitor a temperature of each of said plurality of batteries, said fan control subsystem being configured to deactivate said fan when said temperature of each of said plurality of batteries is less than a nominal temperature.

5. The environmental control system as recited in claim 4 wherein said nominal temperature is about 25° C.

6. The environmental control system as recited in claim 1 further comprising an outside air temperature sensor configured to monitor a temperature of air surrounding said battery cabinet, said fan control subsystem being configured to activate said fan when:
any one of said temperatures of said plurality of batteries exceeds a nominal temperature, and
said temperature of said air surrounding said battery cabinet is less than a differential value below said any one of said temperatures of said plurality of batteries.

7. The environmental control system as recited in claim 6 wherein said differential value is about 3° C.

8. A method of operating a fan to circulate air through a battery cabinet having a plurality of batteries, comprising:
monitoring a voltage associated with said plurality of batteries;
monitoring a temperature of each of said plurality of batteries; and
activating said fan when:
any one of said temperatures of said plurality of batteries exceeds a predetermined temperature, or
said voltage associated with said plurality of batteries exceeds a predetermined voltage.

9. The method as recited in claim 8 wherein said predetermined temperature is about 40° C.

10. The method as recited in claim 8 wherein said predetermined voltage is about 28.25 volts for 24 volt systems and about 56.5 volts for 48 volt systems.

11. The method as recited in claim 8 further comprising:
monitoring a temperature of each of said plurality of batteries; and
deactivating said fan when said temperature of each of said plurality of batteries is less than a nominal temperature.

12. The method as recited in claim 11 wherein said nominal temperature is about 25° C.

13. The method as recited in claim 8, further comprising:
monitoring a temperature of air surrounding said battery cabinet; and
activating said fan when:
any one of said temperatures of said plurality of batteries exceeds a nominal temperature, and said temperature of said air surrounding said battery cabinet is less than a differential value below said any one of said temperatures of said plurality of batteries.

14. The method as recited in claim 13 wherein said differential value is about 3° C.

15. A battery cabinet, comprising:
a plurality of shelves;
a plurality of batteries located on said plurality of shelves;
at least one air inlet louver located in a bottom section of said battery cabinet;
at least one air outlet louver located in a top section of said battery cabinet;
a fan that circulates air from said at least one air inlet louver to said at least one air outlet louver through said battery cabinet; and
an environmental control system, including:
a voltage sensor that monitors a voltage associated with said plurality of batteries,
a plurality of battery temperature sensors that monitor a temperature of a corresponding one of said plurality of batteries, and
a fan control subsystem, coupled to said voltage and battery temperature sensors, that activates said fan when:
said temperature of at least one of said plurality of batteries exceeds a predetermined temperature, or
said voltage exceeds a predetermined voltage.

16. The battery cabinet as recited in claim 15 wherein said predetermined temperature is about 40° C.

17. The battery cabinet as recited in claim 15 wherein said predetermined voltage is about 28.25 volts for 24 volt systems and about 56.5 volts for 48 volt systems.

18. The battery cabinet as recited in claim 15 wherein said fan control subsystem deactivates said fan when said temperature of each of said plurality of batteries is less than a nominal temperature.

19. The battery cabinet as recited in claim 18 wherein said nominal temperature is about 25° C.

20. The battery cabinet as recited in claim 15 wherein said environmental control system further comprises an outside air temperature sensor that monitors a temperature of air surrounding said battery cabinet, said fan control subsystem activating said fan when:
said temperature of at least one of said plurality of batteries exceeds a nominal temperature; and
said temperature of said air surrounding said battery cabinet is less than a differential value below said temperature of at least one of said plurality of batteries.

21. The battery cabinet as recited in claim 20 wherein said differential value is about 3° C.

* * * * *